US012594919B2

(12) United States Patent
Kirmaier et al.

(10) Patent No.: US 12,594,919 B2
(45) Date of Patent: Apr. 7, 2026

(54) TRAILER BRAKE CONTROL SYSTEM

(71) Applicant: AGCO International GmbH,
Neuhausen (CH)

(72) Inventors: Philipp Kirmaier, Marktoberdorf (DE);
Georg Frank, Marktoberdorf (DE);
Stefan Prestel, Marktoberdorf (DE)

(73) Assignee: AGCO International GmbH,
Neuhausen (CH)

( * ) Notice: Subject to any disclaimer, the term of this
patent is extended or adjusted under 35
U.S.C. 154(b) by 396 days.

(21) Appl. No.: 18/253,967

(22) PCT Filed: Nov. 27, 2021

(86) PCT No.: PCT/IB2021/061029
§ 371 (c)(1),
(2) Date: May 23, 2023

(87) PCT Pub. No.: WO2022/130077
PCT Pub. Date: Jun. 23, 2022

(65) Prior Publication Data
US 2024/0092329 A1      Mar. 21, 2024

(30) Foreign Application Priority Data
Dec. 15, 2020    (GB) ..................................... 2019737

(51) Int. Cl.
B60T 13/68        (2006.01)
B60T 7/20        (2006.01)
(Continued)

(52) U.S. Cl.
CPC .............. B60T 13/686 (2013.01); B60T 7/20
(2013.01); B60T 8/1708 (2013.01); B60T
13/662 (2013.01)

(58) Field of Classification Search
CPC .... B60T 7/20–206; B60T 7/042; B60T 7/085;
B60T 8/1708; B60T 8/1887;
(Continued)

(56) References Cited

U.S. PATENT DOCUMENTS 9,162,659 B2    10/2015  Morselli et al.
9,327,694 B2     5/2016  Klostermann et al.
(Continued)

FOREIGN PATENT DOCUMENTS

DE            20315755 U1    12/2003
DE        102011053707 A1     3/2013
(Continued)

OTHER PUBLICATIONS

European Patent Office, International Search Report related to
International Patent Application No. PCT/PCT/IB2021/061029, mail
date Mar. 4, 2022, 14 pages.
(Continued)

*Primary Examiner* — David R Morris

(57) ABSTRACT
A vehicle brake system includes a hydraulic service brake
system having a service brake circuit and a trailer brake
control system. The trailer brake control system includes a
trailer brake valve with a service brake demand input port
and a trailer brake demand output port connected to a trailer
brake control coupling. The output at the trailer brake
demand output port is dependent on the pressure applied at
the service brake demand input port. An electronic trailer
brake control system has a solenoid control valve to connect
the service brake demand input port to a source of pressur-
ized hydraulic fluid to trigger an output at the trailer brake
demand output port. An ECU is configured to actuate the
control valve to apply the trailer brakes if it determines that
the vehicle is at risk of jack-knifing. The system may also
include a shuttle valve.

19 Claims, 5 Drawing Sheets

(51) Int. Cl.
    *B60T 8/17* (2006.01)
    *B60T 13/66* (2006.01)
(58) Field of Classification Search
    CPC .................... B60T 8/248; B60T 8/323; B60T
        8/3255–3265; B60T 8/344–348; B60T
        8/3605; B60T 2230/06; B60T 13/686;
        B60T 13/662; B60T 15/46
    See application file for complete search history.

(56) References Cited

U.S. PATENT DOCUMENTS

| | | | |
|---|---|---|---|
| 9,802,587 | B2 | 10/2017 | Morselli |
| 10,933,852 | B2 | 3/2021 | Goers et al. |
| 11,565,681 | B2 | 1/2023 | Dombek et al. |
| 2011/0193407 | A1 | 8/2011 | Wohltmann et al. |
| 2014/0200786 | A1 | 7/2014 | Morselli et al. |
| 2015/0239441 | A1 | 8/2015 | Klostermann et al. |
| 2015/0344011 | A1 | 12/2015 | Casali et al. |
| 2018/0029569 | A1 | 2/2018 | Schick et al. |
| 2018/0029572 | A1 | 2/2018 | Schick et al. |
| 2018/0319382 | A1* | 11/2018 | Laine ................... B60T 8/1761 |
| 2019/0118788 | A1 | 4/2019 | Bruett et al. |
| 2020/0079341 | A1 | 3/2020 | van Thiel |

FOREIGN PATENT DOCUMENTS

| | | | |
|---|---|---|---|
| EP | 0378810 | A1 | 7/1990 |
| EP | 2165901 | A1 | 3/2010 |
| EP | 2305524 | A1 | 4/2011 |
| EP | 3401177 | A1 | 11/2018 |
| WO | 2019030105 | A1 | 2/2019 |
| WO | 2020200347 | A1 | 10/2020 |

OTHER PUBLICATIONS

UK Intellectual Property Office, Search report for related UK Application No. GB2019737.2, dated May 21, 2021, 4 pages.

* cited by examiner

TRAILER BRAKE CONTROL SYSTEM

CROSS REFERENCE TO RELATED APPLICATIONS

This application is a national phase entry under 35 U.S.C. § 371 of International Patent Application PCT/IB2021/061029, filed Nov. 27, 2021, designating the United States of America and published in English as International Patent Publication WO2022/130077 A1 on Jun. 23, 2022, which claims the benefit of the filing date of U.K. Patent Application 2019737.2, filed Dec. 15, 2020, the entire disclosure of which is incorporated herein by reference.

TECHNICAL FIELD

The present invention relates to a trailer brake control system for a vehicle. The invention relates in particular to a trailer brake control system for an agricultural vehicle such as a tractor.

BACKGROUND

Many vehicles are provided with attached trailers for the transportation of goods and materials. For large-scale use such trailers may be provided with braking systems to allow for safe control of the trailer, and to prevent jack-knifing or skidding of the trailer when braking. Typically, the brake system on the trailer is coupled to an output from a trailer brake control system forming part of the towing vehicle brake system and which provides a fluid pressure signal for actuating the brakes on the trailer.

Vehicles used mainly on roads, such as heavy goods vehicles including trucks, often employ electronic brake control systems. In such systems, the fluid pressure forwarded to the brakes of both the towing vehicle and the trailer is not determined solely in response to pressure applied to a brake pedal. Rather, the pressure forwarded to the brakes is adjusted by an electronic control unit (ECU). This is advantageous as the ECU can be programmed to regulate the applied brake force taking into account inputs provided by various sensors which are indicative of the operative conditions of the vehicle and trailer and other factors. Electronic trailer brake control systems are especially advantageous in avoiding jack-knifing. With a conventional fluid only activated trailer brake control system, when a vehicle towing a trailer is subject to engine braking in which it is decelerated by internal resistance in the vehicle (from the engine, transmission or other components) rather than the application of a service or parking brake, the trailer brakes are not activated and the trailer may tend to skid. To avoid this, an electronic trailer brake control system can be configured to activate the brakes on the trailer when a potential jack-knifing situation is detected.

In addition, trucks are usually equipped with dual service brake systems wherein two separate circuits are activated independently when the brake pedal is depressed. A first circuit may thereby act on, e.g., the right front wheel and the left rear wheel (or the left wheels of tandem rear axle) while a second circuit acts the left front wheel and the right rear wheel (or the right wheels of tandem rear axle). If one of the circuits fail, the other circuit can still provide sufficient brake force to safely decelerate the vehicle.

With trucks often travelling at high speeds on roads, dual service brake systems and electronic trailer brake control systems have become a worldwide standard for these types of vehicles. Whilst such system uses components that are expensive, the relatively high production figures for vehicles of this type enable the costs to be kept at an acceptable level.

Electronic trailer brake control systems are less commonly used on agricultural vehicles, such as tractors, for a number of reasons.

Regulatory requirements are less stringent worldwide. For example, Regulation (EU) 2015/68 "Approval of Braking Requirements for Agricultural and Forestry Vehicles" (the so called "EU Mother Regulation"), which introduces increased safety requirements for the operation of trailer brake systems in the agricultural sector, is only mandatory in the EU, but is not applicable to other important markets like the United States of America or Russia.

The need for a trailer braking system depends on the maximum speed of the vehicle and vehicles which do not exceed a maximum vehicle speed (e.g., 40 kph to 50 kph) may not necessarily be provided with a trailer brake control system.

Tractors are operated with a variety of different implements. An implement may be fully-mounted or semi-mounted, whereby a semi-mounted implement has a wheel engaging with the ground while a fully-mounted implement puts all its load on the three-point linkage. With these type of implements, jack-knifing does not occur as implement and tractor are rigidly connected. Other implements may be so-called trailed implements similar to truck trailers which are connected to the tractor by a ball-type hitch system which allows relative movement between trailer and tractor so that jack-knifing is an issue.

In addition, tractors are additionally provided with a steering brake function, which enables the wheels of on each side to be braked independently to enable tighter turns in the field. This requires special provisions in the service brake not common for trucks.

In view of the issues discussed above, customers for agricultural vehicles such as tractors are demanding greater choice in specifying the type of brake system they require in order to perfectly meet their needs at reasonable costs, subject to legal constraints.

There is need, therefore, for a vehicle brake system which can be more easily adapted to provide different functionality at reasonable costs.

In particular, it is an objective of the disclosure to provide a vehicle brake system incorporating a trailer brake control system that can be easily adapted to provide electronic trailer braking at reasonable costs.

BRIEF SUMMARY

A vehicle brake system comprises a source of pressurized hydraulic fluid; a hydraulic service brake system having at least one service brake fluid circuit for forwarding a service brake demand of an operator; and a trailer brake control system for connection to a trailer drawn by the vehicle. The trailer brake control system has a trailer brake valve which comprises: a brake demand input port; and a trailer brake demand output port for connection to a trailer brake control coupling. A hydraulic fluid pressure output at the trailer brake demand output port is dependent on the fluid pressure applied at the brake demand input port. The brake system comprises an electronic trailer brake control system including a control valve operative when activated to fluidly connect the source of pressurized hydraulic fluid with the brake demand input port. Then electronic trailer brake control system is operative in use to selectively supply pressurized hydraulic fluid indicative of a service brake demand for the trailer to the brake demand input port.

In some embodiments, the electronic trailer brake control system is able to control actuation of a hydraulic service brake function on a trailer towed by the vehicle. Actuation of the electronic trailer brake control system generates a hydraulic fluid pressure at the brake demand input port of the trailer valve. This results in a related hydraulic fluid pressure trailer brake control output port which is forwarded as a service brake demand to the hydraulic brake system on the trailer. Advantageously, the electronic trailer brake control system can be used to reduce the risk of jack-knifing, for example.

The term "trailer" as used herein should be understood as encompassing any suitable unpowered vehicle or implement with a suitable braking system which can be controlled through the brake system of the towing vehicle when suitably coupled.

In an embodiment, the electronic trailer brake control system comprises an electronic control system with an electronic control unit (ECU), the ECU being configured in use to actuate the electronic trailer brake control system in order to supply pressurized hydraulic fluid indicative of a service brake demand for the trailer to the brake demand input port in dependence on one or more operational conditions of the vehicle and/or a trailer towed by the vehicle being met. The ECU may be configured in use to actuate the electronic trailer brake control system in order to supply pressurized hydraulic fluid indicative of a service brake demand for the trailer to the brake demand input port in dependence on one or more operational conditions of the vehicle and/or a trailer towed by the vehicle indicative of a PUSH condition being met.

The brake demand input port may be a service brake demand input port which is operatively connectable to the service brake circuit and an output from the electronic trailer brake control system by a shuttle valve.

The control valve may comprise a solenoid valve actuatable under control of the electronic control system and operative to cause a pressurized hydraulic fluid indicative of a service brake demand for the trailer to be forwarded to the brake demand input port. The valve may have an inlet fluidly connected with the source of pressurized hydraulic fluid and a fluid outlet, the control valve being movable between an inoperative position in which the inlet and outlet are disconnected so that fluid is unable to flow from the inlet through the outlet and at least one operative position in which the inlet and outlet are fluidly connected and fluid is able to flow from the inlet through the outlet. The outlet of the control valve may be fluidly connected with the brake demand input port (through a shuttle valve in some cases). In this case, the fluid pressure through the valve when the valve is in an operative position may be felt at the brake demand inlet port. Alternatively, the control valve is a pilot valve, the outlet of the control valve being connected to a control port of a piloted valve, the piloted valve being operative to selectively connect the brake demand input port to a source of pressurized hydraulic fluid (through a shuttle valve in some cases).

The electronic trailer brake control system may be configured to supply fluid to the brake demand input port at a pressure below the maximum pressure of the at least one service brake circuit.

In an embodiment, a pressure limiting valve is provided in the line between the source of pressurized hydraulic fluid and the control valve to limit the fluid pressure level through the control valve.

In an embodiment, the system comprises a pressure sensor for monitoring the pressure of the fluid output from the trailer brake demand output port, the ECU being configured to control operation of the electronic trailer brake control system in dependence on an output from the pressure sensor in order to maintain the pressure of the fluid supplied to the brake demand input port at a predetermined level.

The control valve may be a proportional valve.

If an outlet of the control valve is fluidly connected with the brake demand input port (through a shuttle valve in some cases), a pressure discharge valve may be operatively connected in a fluid line between the control valve and the brake demand input port, the discharge valve being operative in a first position to depressurize the fluid line. Alternatively, if the control valve is a pilot valve, the outlet of the control valve being connected to a control port of a piloted valve, a pressure discharge valve may be operatively connected in a fluid line between the control valve and the piloted valve, the discharge valve being operative in a first position to depressurize the fluid line. The electronic trailer brake control system may be configured to connect the pressure discharge valve to ambient and depressurize the fluid line when the control valve is in an inoperative position.

In an embodiment, the service brake system has a first service brake circuit and a second service brake circuit, each service brake circuit for forwarding fluid pressure indicative of a service brake demand of an operator, the trailer brake valve having a first service brake demand inlet port and a second service brake demand input port, the pressure output at trailer brake demand output port being dependent on the pressure applied at the first service brake demand input port and/or on the pressure applied at the second service brake demand input port, wherein one of the first and second service brake demand ports constitutes the brake demand input port and is operatively connected with its respective service brake circuit and an output from the electronic trailer brake control system through a shuttle valve.

In an embodiment, the service brake system has a first service brake circuit and a second service brake circuit, each service brake circuit for forwarding fluid pressure indicative of a service brake demand of an operator. The trailer brake valve has a first service brake demand inlet port and a second service brake demand input port. The pressure output at trailer brake demand output port is dependent on the pressure applied at the first service brake demand input port and/or on the pressure applied at the second service brake demand input port. One of the first and second service brake circuits is connected with one of the first and second service demand input ports, and the other of the first and second service brake demand input ports is connected with an output from the electronic trailer brake control system.

The electronic trailer brake control system may be connected with the source of hydraulic fluid under pressure through the trailer brake valve. In an embodiment, the trailer brake valve has a fluid supply input port fluidly connected with the source hydraulic fluid under pressure, the trailer brake valve having a fluid supply output port operatively connected with the fluid supply input port, the electronic trailer brake control system valve being fluidly connected with the fluid supply output port by a control system supply line. The control system supply line may be connected with an inlet side of the control valve. Where present, an inlet side of the piloted valve may be connected with the control system supply line. The source of pressurized hydraulic fluid may be a hydraulic pump.

In certain embodiments, there is provided an agricultural vehicle comprising such a vehicle brake system. The agricultural vehicle may be a tractor.

BRIEF DESCRIPTION OF THE DRAWINGS

The disclosure will now be described, by way of example only, with reference to the following drawings, in which.

DETAILED DESCRIPTION

Figure 1:
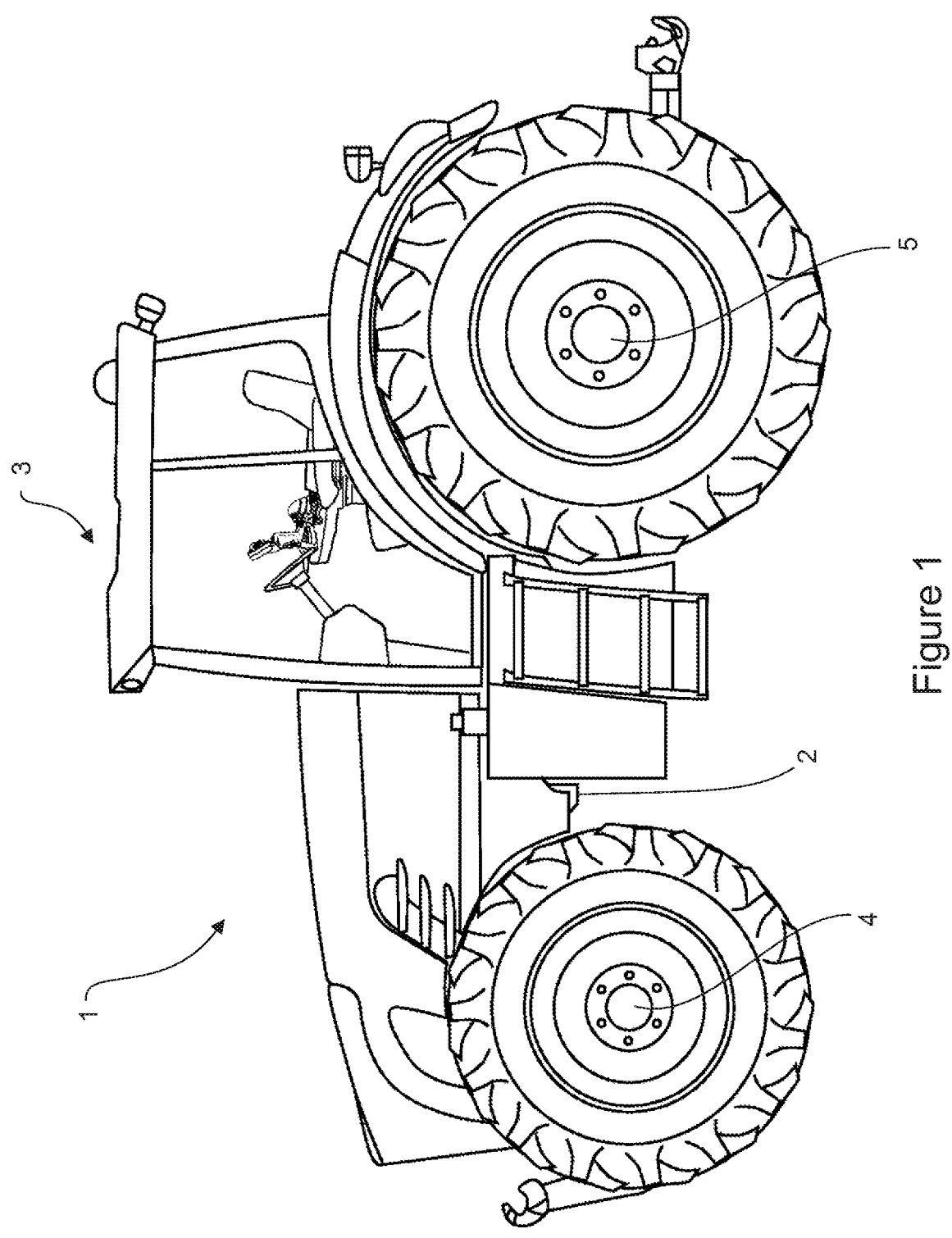
FIG. 1 is a side view of an agricultural tractor having a brake system.

The term "circuit" as used herein is not limited to a closed loop arrangement of lines and may refer to arrangements as simple as a single line linking two components or consumers.

In the following, the same reference numerals will be used to denote the same features or features that perform substantially the same function in the various embodiments.

FIG. 1 shows a representation of an agricultural vehicle 1, in the form of a tractor. The tractor 1 comprises a chassis 2, a cab 3, a front axle 4, and a rear axle 5 and is adapted to tow a range of different trailers. The tractor 1 has a brake system 10 which is connectable to a brake system on a trailer to control the trailer brakes.

Figure 2:
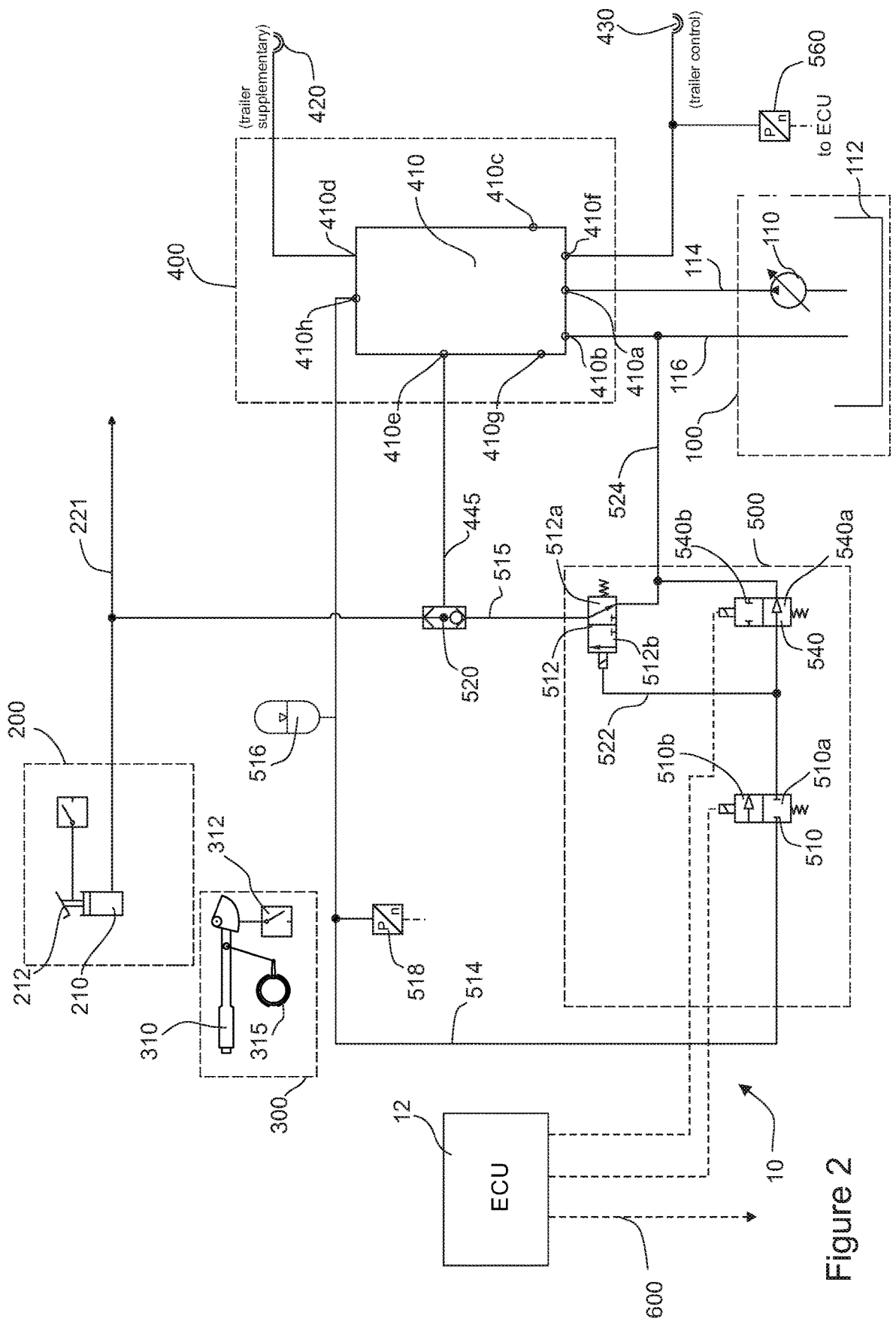
FIG. 2 is a schematic representation of a part of a vehicle brake system according to a first embodiment suitable for use in the tractor of FIG. 1.

FIG. 2 illustrates a first embodiment of a brake system 10 installed on the tractor 1 and which comprises electronic control unit ECU 12.

The brake system 10 is a hydraulic brake system which includes a hydraulic fluid supply system for supplying hydraulic fluid under pressure, indicated generally at 100. The hydraulic fluid supply system 100 includes a hydraulic pump 110 and a hydraulic fluid tank 112. The pump 110 supplies pressurized hydraulic fluid to various hydraulic consumers on the vehicle, and to a trailer when coupled to the vehicle, as well as the brake system 10 in a manner well known in the art. The tank provides a reservoir of hydraulic fluid at ambient pressure The brake system 10 includes a service brake system indicated generally at 200. The service brake system 200 includes a service brake circuit 221 with a brake master cylinder 210 operated by a brake pedal 212 depressed by the foot of an operator to generate a fluid pressure in the service brake circuit 221. The fluid pressure generated in the service brake circuit 221 is dependent on the pressure applied by the operator to brake pedal and is indicative of a brake demand by the operator. This fluid pressure will, therefore, be referred to as a Service Brake Demand Signal (SBDS). As is common practice in agricultural machines such as tractors, in order to increase brake actuation force, the service brake circuit 221 may include brake boosters supplied with hydraulic fluid under pressure by the pump 110 so that the hydraulic pressure applied at the brake actuators is higher than that produced by the operator pressing on the brake pedal. In this embodiment, there is a single service brake circuit 221 but as illustrated in relation to further embodiments, there may be more than one service brake circuit in a brake system 10 according to the invention.

References herein to a "brake demand" or "brake demand signal" in relation to a hydraulic line or circuit should be understood as referring to a pressure of the fluid in the line or circuit which is indicative of a required braking force.

The vehicle also has a park brake system indicated generally at 300. The park brake system includes an actuator 310, in this case in the form of a park brake lever, which is used by the operator to apply and release the park brakes. The park brake system 300 is a mechanical system in which the park brake lever is mechanically coupled, for example by means of a cable, with one or more park brake actuators 315 on the vehicle. As such mechanical park brake systems are well known, it will not be described in detail. A brake system 10 as disclosed can be adopted on a tractor or other agricultural vehicle or machine having alternative park brake systems, including hydraulic or pneumatic park brake systems.

The brake system 10 includes a trailer brake control system 400 operatively connected to a trailer when coupled to the tractor 1. The trailer brake control system is provided with a trailer brake valve 410 to control application of the brakes on a trailer in dependence on the service brake demand signal SBDS received from the service brake system 200. The trailer brake valve 410 is an electronically controlled valve and is operatively connected with the ECU.

When the vehicle 1 is towing a trailer, the hydraulic system of the trailer (not shown) is connected with the hydraulic system of the vehicle via standardized trailer couplings 420, 430. These include a supplementary trailer coupling 420 and a trailer brake control coupling 430. The supplementary trailer coupling 420 provides fluid supply to the trailer park brake system. The trailer brake control coupling 430 is provided to forward a trailer service brake demand signal TSBDS to the trailer brake system to provide a service brake functionality on the trailer.

In a common arrangement, the brake system on the trailer may have combined brake units which have a first service brake actuator responsive to hydraulic fluid pressure to apply a braking force to provide a service brake function and a second park brake actuator which is spring-biased to apply a braking force to provide a park brake function. The park brake actuator is held in a brake released position by hydraulic fluid pressure when the park brakes are deactivated. If the fluid pressure drops, the spring load applies the full brake force. The supplementary trailer coupling 420 is normally connected to the park brake system on the trailer via a brake valve on the trailer. The trailer brake control coupling 430 is also connected to the brake valve on the trailer. The trailer service brake demand pressure signal TSBDS provided through the brake control coupling 430 pilot-controls the brake valve of the trailer to generate a controlled brake pressure forwarded to the service brake actuators of the combined brake units, which apply a corresponding service brake force to the wheels of the trailer.

Operation of the trailer brake valve 410 is now be explained in detail.

The trailer brake valve has eight ports 401$a$ to 401$h$.

The hydraulic pump 110 is connected to a fluid supply input port 410$a$ of the trailer valve via a supply line 114. A fluid return port 410$b$ is connected with the hydraulic fluid tank 112 through a return line 116 to enable hydraulic fluid to be returned to the tank 112, such as a part of the hydraulic system is to be returned to ambient.

Hydraulic fluid supplied by the pump 110 through the fluid supply input port 410$a$ can be directed to various hydraulic consumers on the tractor 1, or a trailer when coupled to the tractor, through a consumer supply output port 410*c*.

A fourth port 410*d* is connected to the supplementary trailer coupling 420 to supply hydraulic fluid for the park brake function on the trailer. In this embodiment where the tractor park brake is mechanical, a micro switch 312 is operatively connected to the park brake lever 310 and provides an input to the ECU. When an operator applies the park brake on the vehicle using the lever 310, the switch 312 provides a park brake on signal to the ECU. In response, the ECU actuates the trailer brake valve 410 so that the fluid pressure provided to the trailer park brake through the supplementary coupling 420 is reduced to ambient. This causes the spring-biased park brake actuators on the trailer to apply the trailer brakes. When the operator releases the park brakes using the lever 310, the switch 312 provides a park brake off signal to the ECU. The ECU in response actuates the trailer brake valve 410 so that the fluid pressure provided to the trailer park brake through the supplementary coupling 420 is increased to release the park brake actuators on the trailer.

A fifth port 410*e* of the trailer brake valve is operatively connected to the service brake circuit via a service brake demand input line 445. This port receives the service brake demand signal (fluid pressure) SBDS from the service brake circuit 221. The service brake demand signal SBDS controls an internal relay of valve 410 (not shown in detail) which generates a trailer service brake demand signal (fluid pressure) TSBDS which is forwarded to the trailer brake control coupling 430 through a sixth port 410*f* to control the service brake functionality of the trailer. The sixth port 410*f* will be referred to as the trailer brake demand output port. The TSBDS is proportional to the SBDS applied at the port 410*e*.

The trailer valve 410 also has a load sensing port 410*g* which is used to enable adjustment of the supply from the main hydraulic pump 110 based on the demand of the hydraulic consumers and/or the trailer brake. Such arrangements are known in the art and will not be described in detail.

The trailer brake valve 410 may have provision for responding to critical driving situations in case of breakaway at trailer couplings 420, 430. Furthermore, the trailer brake valve 410 may have provision to adjust the advancement of the trailer brake so that when the service brake on the vehicle is activated only slightly, a slightly higher pressure is applied to the trailer to ensure that the trailer brakes are operated prior to the service brake of the tractor. This reduces the risk of the trailer pushing the tractor which could lead to jack-knifing. The degree of advancement can be set manually at the trailer brake valve 410.

Trailer brake valves 410 of the type described which produce a fluid pressure output at the trailer brake demand output port dependent on the fluid pressure applied at a brake demand input port are well known in the art and details of the valve will not be described further.

The vehicle brake system as so far described comprising the service brake system 200, the park brake system 300, and the trailer brake control system 400 is known in the art. In such known brake systems, control of the service brake function on the trailer is dependent on actuation of the service brake 200 on the vehicle. A brake system comprising these components can be adopted if electronically controlled actuation of the service brakes on the trailer is not required. As discussed above, such a brake system may be sufficient for some type of implements or vehicles that do not exceed a certain maximum speed and can be offered at relatively low cost. However, the brake system 10 can be modified to provide electronic trailer service brake functionality as discussed below.

For example, the vehicle brake system 10 is additionally provided with an electronic pilot trailer brake control system 500. The electronic trailer brake control system 500 in this embodiment has a fluid circuit including a control valve 510, a piloted relay valve 512, and a shuttle valve 520. The electronic trailer brake control system 500 has an electronic control system including an ECU 12 which controls operation of various valves in the fluid circuit. The control valve 510 controls actuation of the piloted relay valve 512 in order to selectively open or close a fluid connection between a source of pressurized hydraulic fluid (e.g., pump 110) and a service brake pilot line 515. In a convenient arrangement, the control valve 510 and the piloted relay valve 512 are connected to a supply of pressurized hydraulic fluid from the pump 110 through a control system supply line 514 connected to an output port 410*h* of the trailer brake valve 410. The trailer brake valve 410 is operative to transfer some of the hydraulic fluid supplied by the pump 110 through the fluid supply inlet port 410*a* to the output port 410*h*. This provides a convenient way of connecting the electronic trailer brake control system 500 to the hydraulic system of the vehicle. It reduces the number of fluid connections required to incorporate the electronic trailer brake control system 500 and so makes it easier to integrate the electronic trailer brake control system into the hydraulic system of an existing tractor design using a suitable trailer brake valve 410. However, it will be appreciated that the electronic trailer brake control system 500 could be connected to the hydraulic pump in other ways.

An accumulator 516 and a pressure sensor 518 may be connected to the electronic trailer brake control system supply line 514. The pressure sensor 518 is connected with the ECU and used to monitor hydraulic pressure in the supply line 514, and the accumulator 516 maintains a relatively constant pressure in the line 514, which might otherwise fluctuate in response to changes in demand on the pump 110.

The piloted valve 512 is biased by a spring to a first position 512*a*, as shown in FIG. 2, in which the service brake pilot line 515 is disconnected from the control system supply line 514 and so is not pressurized. In this position, the piloted valve connects the service brake pilot line 515 to the hydraulic tank 112 via a control system return line 524, 116 so that the service brake pilot line is at ambient pressure. When the piloted valve 512 is activated by supplying pressurized hydraulic fluid to a control port 512*c*, the piloted valve is moved to a second position 512*b* in which the service brake pilot line 515 is connected to the control system supply line 514 so that the service brake pilot line 515 is pressurized.

Actuation of the piloted relay valve is controlled by the control valve 510. The control valve 510 is connected to the control system supply line 514 at an inlet port and has an outlet port which is connected via a control valve pilot line 522 to the control port 512*c* of the piloted valve. Control valve 510 is a solenoid valve and is biased by a spring to a first position 510*a*, as shown in FIG. 2, in which the control valve pilot line 522 is disconnected from the control system supply line 514 and so is not pressurized. When energized, the control valve 510 moves to a second position 510*b* in which it connects the control valve pilot line 522, and hence the control port 512*c* on the piloted relay valve 512, to the control system supply line 514. This applies a fluid pressure to the control port 512c to actuate the piloted relay valve 512, moving it to its second position so that the service brake pilot line 515 is pressurized.

The service brake pilot line 515 is connected at a first input of the shuttle valve 520. A second input to the second shuttle valve 520 is connected to the service brake circuit 221. The output side of the shuttle valve 520 is connected to the service brake demand input port 401e of the trailer brake valve 410 via the service brake demand input line 445. Shuttle valve 520 provides a hydraulic OR functionality (i.e., logic control) to forward either the pressure in service brake circuit 221 or the pressure in service brake pilot line 515 (whichever is at the highest pressure) to the service brake demand input port 410e of the trailer brake valve. The application of fluid pressure at the service brake demand input port 401e, whether from the service brake circuit 221 or the service brake pilot line 515, will result in a corresponding fluid pressure (TSBDS) being output at the trailer brake demand output port 410f. This is forwarded to the trailer brake system via the trailer brake control coupling 430 to actuate the service brakes on the trailer.

The electronic trailer brake control system 500 is operative to apply the service brake function of the trailer in certain circumstances when the service brake circuit 221 of the towing vehicle is either not pressurized or only pressurized to a limited amount. The electronic trailer brake control system 500 is operative in particular to selectively apply the service brake function of the trailer to reduce the risk of jack-knifing, for example when the towing vehicle is under engine braking as described in further detail below.

Jack-knifing occurs when the trailer pushes the towing vehicle (known as PUSH mode or condition) rather than the towing vehicle pulling the trailer (PULL mode or condition). In general terms, a PUSH condition exists if the torque input to the vehicle wheels driven by the inertia of the trailer is greater than the nominal torque supplied by the engine or other prime mover (in certain conditions). This condition may be detected by monitoring one or more parameters available on the vehicle and or trailer. A known parameter used to detect PUSH condition in trucks is the difference of the set engine speed and the current engine speed. When going downhill, the trailer pushes the truck tractor and thereby wheels begin to rotate faster so the setting of the engine speed (depending on the desired speed) and the speed of the engine (transmitted via wheels) would show a deviation. Alternative approaches, include comparing torque supply by the engine with the torque transmitted via the wheels. European Patent EP 2269880 B1, "Brake for a Traction Vehicle Trailer Combination," and European Patent EP 3216333 A2, "Agricultural Train Comprising a Towing Vehicle and a Trailer," disclose arrangements for determining when an agricultural vehicle such as a tractor is in a PUSH condition. A further known system for detecting PUSH condition in a tractor is described in U.S. Patent Application Publication 2023/0009316 A1, "Trailer Brake System," published Jan. 12, 2023. In this system, the vehicle has a continuously-variable hydrostatic transmission. The vehicle transmission includes a first pressure sensor arranged to measure a fluid pressure at a predetermined point within the transmission, and a rotation sensor arranged to determine a rotation direction of a predetermined component in a driveline of the vehicle. When the vehicle is towing a trailer, an ECU unit coupled to the first pressure sensor and rotation sensor determines when a PUSH condition exists based on a particular combination of pressure and rotational direction and applies the trailer brakes to reduce the risk of jack-knifing.

Input from a PUSH condition detection system or sensors for use in detecting a PUSH condition is provided to the ECU 12 as indicated at 600. If a PUSH condition is detected, the electronic trailer brake control system 500 is utilized to avoid jack-knifing. In response to a determination that a PUSH condition exists, the ECU energizes the two-position control valve 510, moving it to the second position 510b. This actuates the piloted relay valve 512, moving it to the second position 512b and so pressurizes the service brake pilot line 515 and (via second shuttle valve 520) the service brake demand input line 445 to port 410e of the trailer brake valve 410. The trailer brake valve 410 provides a corresponding trailer service brake demand signal TSBDS output at the port 410f, which is forwarded to trailer via the trailer brake control coupling 430 so that the service brake function of the trailer is engaged.

Though it is particularly advantages that the ECU is configured to apply the service brakes on the trailer to avoid a potential jack-knife situation, the ECU can be configured to apply the service brakes on a trailer being towed by the vehicle in dependence on one or more operational conditions of the vehicle and/or trailer other than a PUSH condition being met if appropriate.

The system can be configured such the electronic trailer brake control system 500 does not initiate a full braking of the trailer, which could result in a dangerous driving condition. For example, the pressure fed to port 401e of the trailer brake valve may be limited. Alternatively, a further pressure sensor 560 may be provided in the hydraulic line between the trailer brake demand output port 410f and the trailer control coupling 430 and coupled to the ECU to provide a signal indicative of the pressure in the line. The ECU may be configured to regulate actuation of the electronic trailer brake control system so that the fluid pressure forwarded through the trailer brake control coupling 430 does not exceed a predetermined value to ensure the service brakes on the trailer are not fully applied.

As noted above, when the piloted relay valve 512 is in its second position 512a, the service brake pilot line 515 is connected to the hydraulic fluid tank 112 through the control system return line 524. This prevents pressurized hydraulic fluid being trapped in the service brake pilot line 515 and the first service brake input line 445 when the control valve 510 and the piloted valve 512 are moved back to their first positions 510a, 512a. As a further precaution, a discharge valve 540 may be connected to the control valve pilot line 522. The discharge valve 540 is a solenoid valve and is operative to vent the control valve pilot line 522 to the hydraulic fluid tank 112 through the control system return line 524, 116 when in a first position 540a to which it is biased by a spring. The discharge valve is energized by the ECU to move to a second position 540b in which the control valve pilot line 522 is not vented to the tank when the control valve 510 is energized to the second position 510b to actuate the piloted relay valve 512 and connect the service brake pilot line 515 to the control system supply line 514. Discharge valve 540 provides additional safety feature as pressurized fluid trapped in lines 515, 522, 445 could result in actuation of the trailer brakes even if control valve 510 is in its non-activated first position 510a. The presence of pressurized fluid trapped in lines 515, 522, 445 may harm functionality of the service brake input to trailer brake valve 410. To avoid this, the discharge valve 540 and the piloted relay valve 512 always connect the control valve pilot line 522 and the service brake pilot line 515 with the tank 112 to discharge fluid pressure completely when control valve 510 is in its first position 510a. Since the control valve 510, the piloted valve, and the discharge valve 540 are all spring-biased to their first positions, this provides a fail-safe system in which the control valve pilot line 522 and the service brake pilot line 515 will be depressurized in the event of a failure to the electric current supply to these valves.

The electronic control functions of the electronic trailer brake system 500 may be provided by a vehicle ECU or by separate ECU dedicated to the system 500. Use of a dedicated ECU would avoid the need to provide electrical interfaces in a vehicle ECU for this optional feature. In this case, the vehicle ECU and the electronic trailer brake system 500 ECU would communicate via a CAN BUS interface. The ECU may be programmable and comprise a processor and memory as is well known in the art.

It should also be noted that though the valves 510, 512, 520, and 540 are described as separate elements, they may be included in a valve manifold.

The use of a piloted relay valve 512 to connect the service brake pilot line 515 to the hydraulic fluid source 514, 110 may be particularly beneficial where the volume of fluid provided to the service brake pilot line 515 to actuate the service brakes on the trailer is relatively high, as the control valve 510 can be operated using a smaller volume of fluid. However, where the volume of fluid required is not overly large, as will often be the case in a hydraulic brake system, the pilot valve 512 can be omitted, and the control valve 510 itself can be used connect the service brake pilot line 515 to the source of pressurized hydraulic fluid 514. Such an arrangement is illustrated in FIG. 3.

Figure 3:
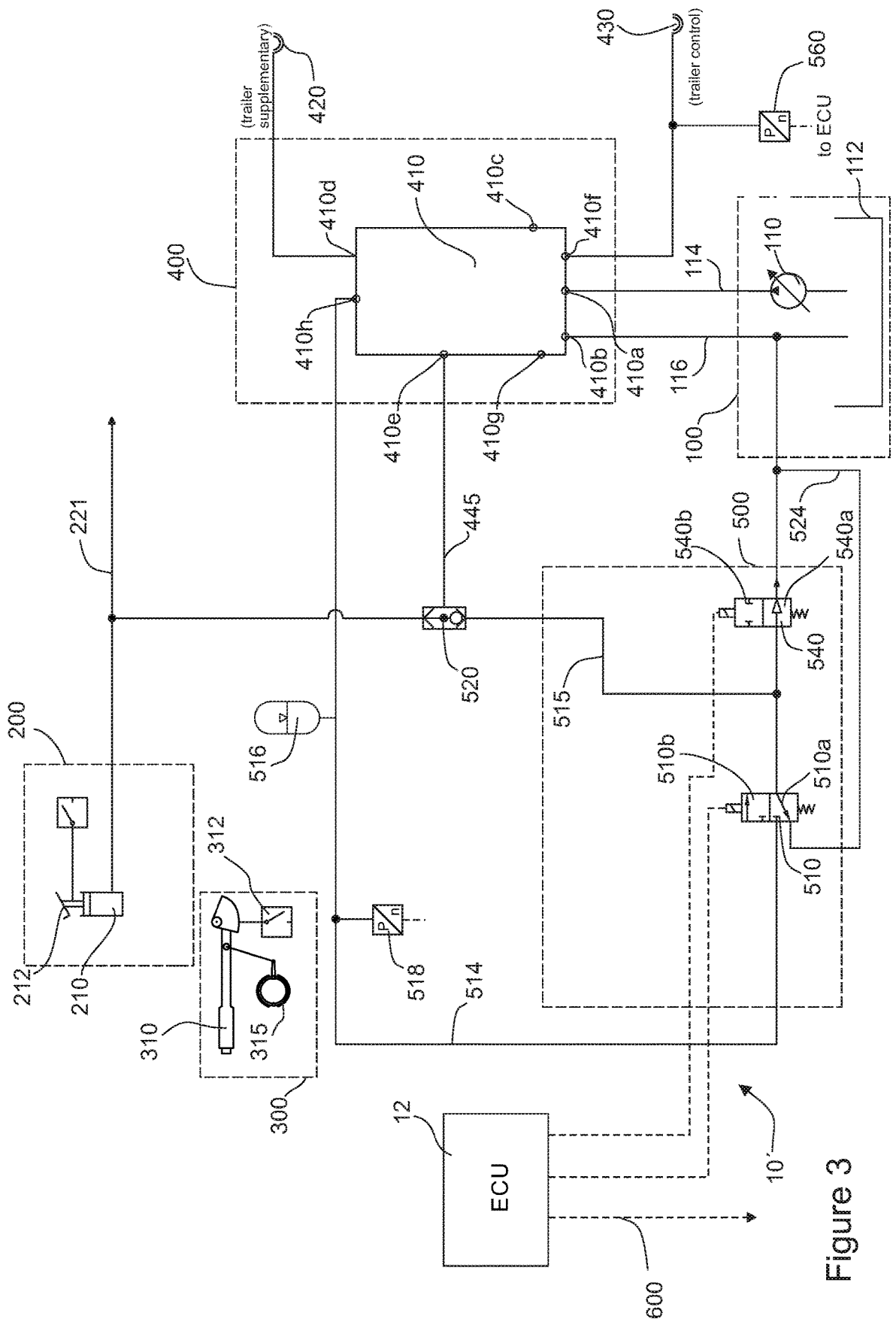
FIG. 3 is a schematic representation of a part of a vehicle brake system according to a second embodiment suitable for use in the tractor of FIG. 1.

The brake system 10' as shown in FIG. 3 is substantially the same as that shown in FIG. 2 and described above. Accordingly, only the differences between the brake system 10' in FIG. 3 and that of FIG. 2 will be described in detail.

In the brake system 10', there is no piloted relay valve 512. Rather, the service brake pilot line 515 is connected directly to an outlet port of the control valve 510 so that when the valve is activated and moved to its second position 510b, the service brake pilot line 515 is connected with the control system supply line 514 through the control valve 510, and hence is pressurized by the supply of pressurized hydraulic fluid from the pump 110. In this embodiment, the control valve 510 has an additional outlet port through which the service brake pilot line 515 is connected to the hydraulic fluid tank 112 (ambient) via the control system return line 524 when the valve is in its first position 510a. In a further modification, the discharge valve is connected with the service brake pilot line 515. This ensures that the service brake pilot line 515 and the service brake input line 445 are fully depressurized when the control valve 510 and discharge valves are in their first positions. The electronic trailer brake control system 500 otherwise operates as described above with reference to FIG. 2 under control of the ECU to actuate the service brakes on the trailer when required.

Figure 4:
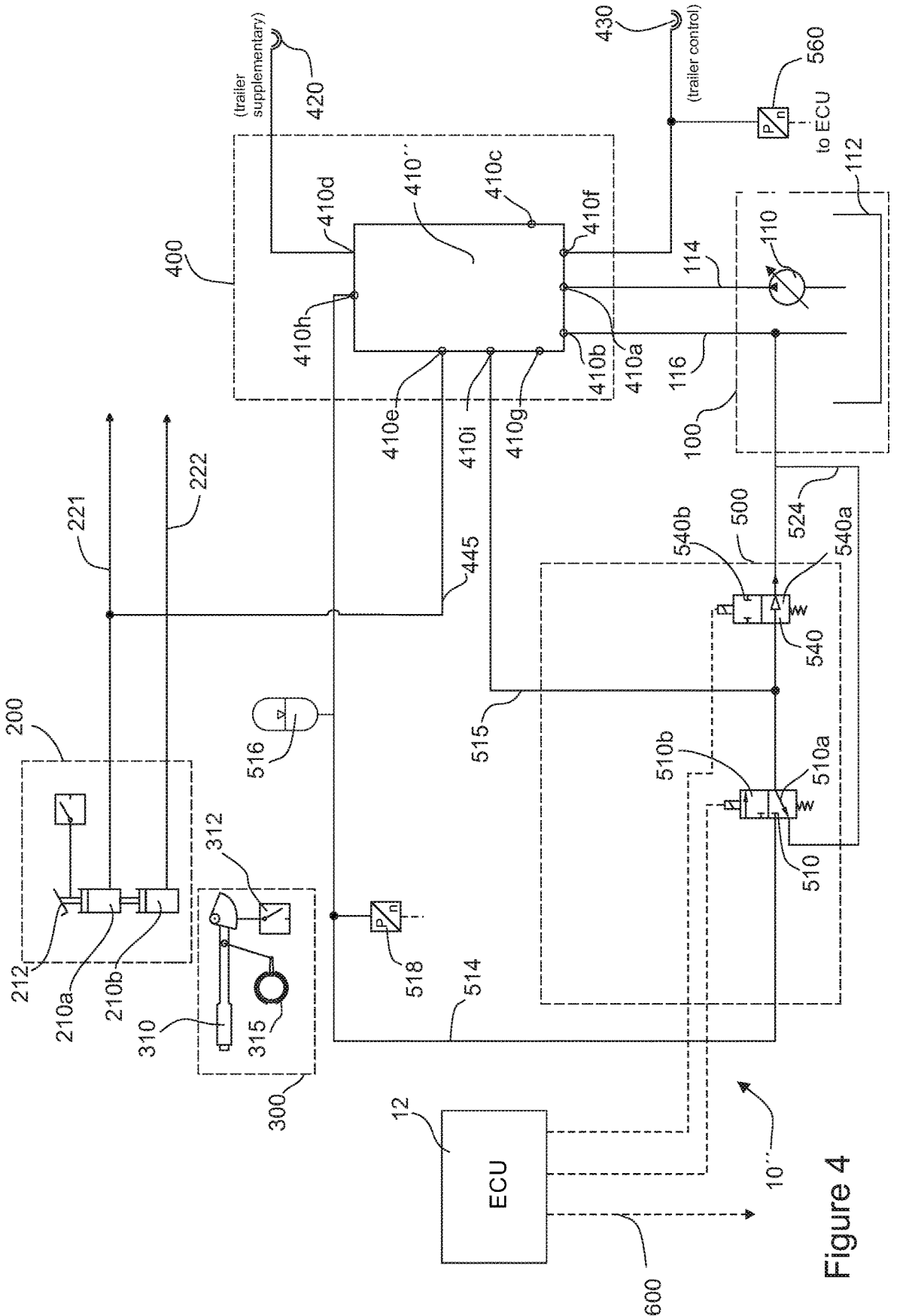
FIG. 4 is a schematic representation of a part of a vehicle brake system according to a third embodiment suitable for use in the tractor of FIG. 1.

FIG. 4 illustrates a further embodiment of a brake system 10". In this embodiment, the trailer brake valve 410" has an additional service brake demand input port 410i. The trailer brake valve 410" is configured such that a service brake demand signal SBDS applied to either of the service brake demand ports 410e or 410i will generate a trailer service brake demand signal (fluid pressure) TSBDS which is forwarded to the trailer brake control coupling 430 through the trailer brake demand output port 410f.

The service brake system 200 has two separate service brake circuits 221, 222, each operatively connected with a separate brake master cylinder 210a, 210b which are actuated from a single brake pedal 212. This provides for redundancy in case one of the circuits fails. In a dual circuit service brake system, the first service brake circuit 221 may be hydraulically connected to the brake actuators on the rear axle 5 while the second service brake circuit 222 is hydraulically connected to the brake actuators of the front axle 4. In case of failure of one of service brake circuits 221, 222 (e.g., a hydraulic line breaks), the other circuit 221, 222 can still be pressurized to provide braking capability. However, the assignment of the service brake circuits 221, 222 to respective vehicle wheels or axles may vary. For example, an alternative configuration may have a diagonal assignment so that brakes on the front left wheel and rear right wheel may be actuated by a first service brake circuit 221 while those on the front right wheel and rear left wheel may be actuated by a second service brake circuit 222. In a further alternative, the circuits may be arranged to actuate the brakes on opposite sides of the tractor, which may be required to provide a brake steering functionality. The fluid pressures in first and second service brake circuits 221, 222 represent service brake demand signals SBDS1, SBDS2 generated by the driver and which are forwarded to other components.

As illustrated in FIG. 4, though the trailer brake valve 410" has two service brake demand input ports 410e or 410i, the brake system 10" is arranged so that only one of the service brake circuits 221, 222 is connected to the trailer brake valve 410. In this case, the first service brake circuit 221 is connected through service brake demand input line 445 to a first one of the service brake demand input ports 410e, which receives the service brake demand signal SBDS1. This enables the service brake pilot line 515 to be connected to the other of the service brake demand input ports 410i without the need for a shuttle valve.

As with the previous embodiment, the pilot trailer brake control system 500 as shown in FIG. 4 does not have a piloted relay valve 512 but uses the control valve 510 itself to connect the service brake pilot line 515 and the service brake demand input port 410i to control system supply line 514 when the valve is actuated to move to its second position, in a manner similar to that discussed above in relation to FIG. 3. However, the brake system could be modified to use a piloted relay valve 512 if required. In this case, the electronic trailer brake control system 500 would be configured as shown in FIG. 2, except that the service brake pilot line 515 is connected to the second service brake demand input port 410i without the need for a shuttle valve.

Figure 5:
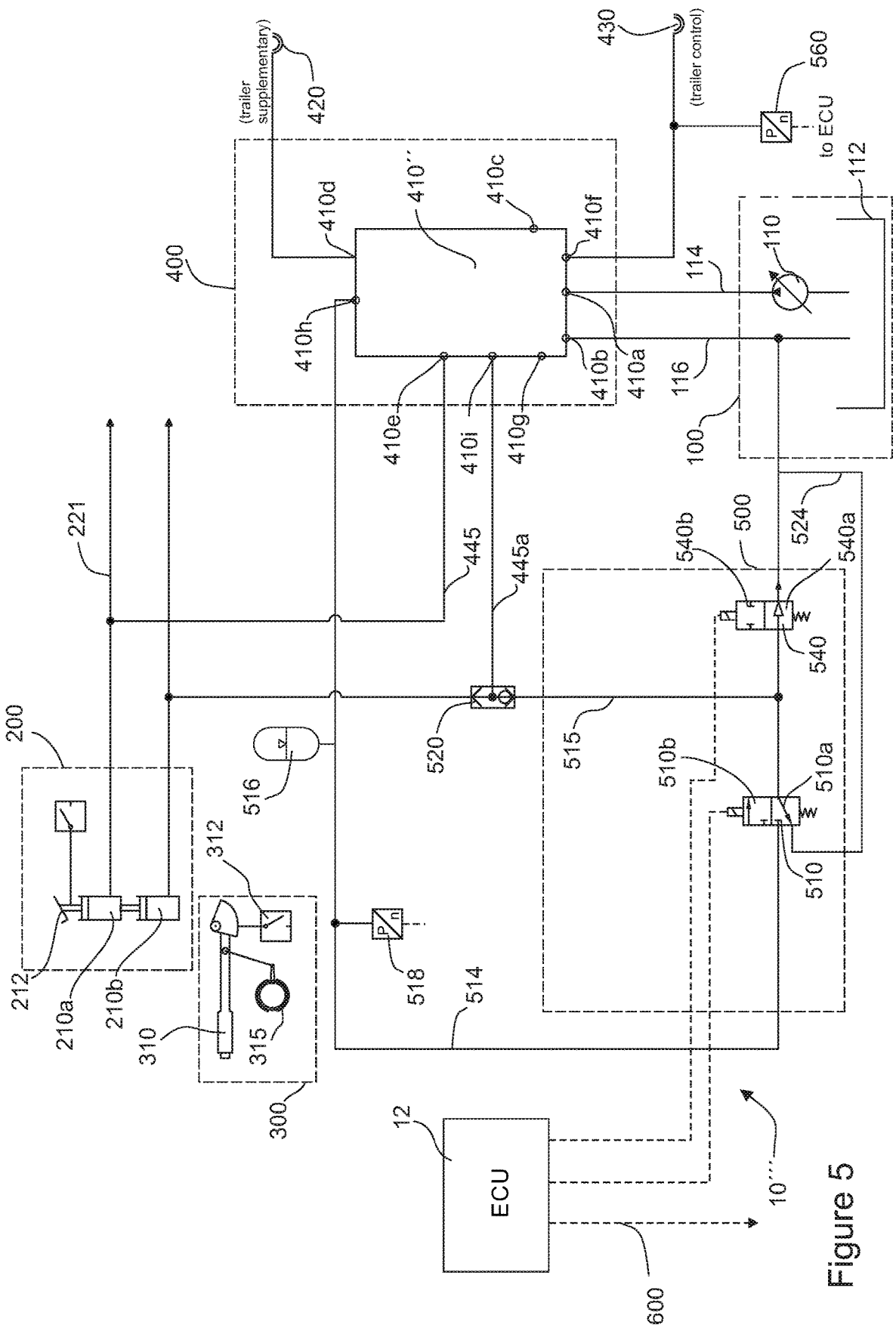
FIG. 5 is a schematic representation of a part of a vehicle brake system according to a fourth embodiment suitable for use in the tractor of FIG. 1.

The brake system 10" of FIG. 4 is reliant on one of the service brake circuits 221 to provide a SBDS to the trailer brake valve 410" to actuate the service brake function on the trailer during normal driving. Though this is perfectly acceptable, in the event the first service brake circuit 221 were to fail, no service brake demand would be forwarded to the trailer from the second service brake circuit. Alternatively, as illustrated in FIG. 5, each of the service brake circuits may be connected with a respective one of the service brake demand input ports 410e, 410i. To allow for electronic control of the service brake function on the trailer, the service brake pilot line 515 and one of the service brake circuits 222 are connected to one of the service brake demand input ports 410i through a shuttle valve 520 and a service brake demand input line 445a. Shuttle valve 520 provides a hydraulic OR functionality (i.e., logic control) to forward either the pressure in service brake circuit 222 or the pressure in service brake pilot line 515 (whichever is at the highest pressure) to the service brake demand input line 445a and to the service brake demand input port 410i of the trailer brake valve. It will be appreciated that the service brake pilot line 515 could alternatively be connected together with the first service brake circuit 221 to the other service brake demand input port 410e though a shuttle valve 520.

As with the previous embodiment, the electronic trailer brake control system 500 as shown in FIG. 5 does not have a piloted relay valve 512 but uses the control valve 510 to connect the service brake pilot line 515 and the service brake demand input port 410i to the control system supply line 514 and hence the pressurized hydraulic fluid from the pump 110 when the valve is activated. However, the brake system 10''' could be modified to use a piloted relay valve 512 if required.

The brake system and the embodiments described above provides electronic trailer braking function which can be easily incorporated into existing brake systems that currently only provide a fully hydraulic trailer brake control system.

Various modifications to the brake system will be apparent to those skilled in the art.

The invention claimed is:

1. A vehicle brake system comprising:
a source of pressurized hydraulic fluid;
a hydraulic service brake system having at least one service brake fluid circuit configured to forward a service brake demand of an operator;
a trailer brake control system for connection to a trailer drawn by a vehicle, the trailer brake control system having a trailer brake valve which comprises:
a brake demand input port; and
a trailer brake demand output port for connection to a trailer brake control coupling, the trailer brake valve configured to generate a hydraulic fluid pressure output at the trailer brake demand output port which is dependent on the fluid pressure applied at the brake demand input port; and
an electronic trailer brake control system including a control valve operative to fluidly connect the source of pressurized hydraulic fluid with the brake demand input port, the electronic trailer brake control system being operative in use to selectively supply pressurized hydraulic fluid indicative of a brake demand for the trailer to the brake demand input port.

2. The vehicle brake system of claim 1, wherein the electronic trailer brake control system comprises an electronic control system including an electronic control unit (ECU), the ECU being configured in use to actuate the electronic trailer brake control system to supply the pressurized hydraulic fluid indicative of the brake demand for the trailer to the brake demand input port in dependence on meeting at least one operational condition selected from the group consisting of operational conditions of the vehicle and operational conditions of a trailer towed by the vehicle.

3. The vehicle brake system of claim 2, wherein the ECU is configured in use to actuate the electronic trailer brake control system to supply the pressurized hydraulic fluid indicative of the brake demand for the trailer to the brake demand input port in dependence on meeting at least one operational condition indicative of a PUSH condition.

4. The vehicle brake system of claim 1, wherein the brake demand input port is a service brake demand input port operatively connectable to the at least one service brake circuit and an output from the electronic trailer brake control system by a shuttle valve.

5. The vehicle brake system of claim 1, wherein the control valve is actuatable under control of the electronic control system and operative to cause the pressurized hydraulic fluid indicative of the brake demand for the trailer to be forwarded to the brake demand input port when activated.

6. The vehicle brake system of claim 5, wherein the control valve has an inlet fluidly connected with the source of pressurized hydraulic fluid and a fluid outlet, the control valve being movable between an inoperative position in which the inlet and outlet are disconnected so that fluid is unable to flow from the inlet through the outlet and at least one operative position in which the inlet and outlet are fluidly connected and fluid is able to flow from the inlet through the outlet, the outlet being fluidly connected with the brake demand input port.

7. The vehicle brake system of claim 6, wherein a pressure discharge valve is connected in a fluid line between the control valve and the brake demand input port, the discharge valve operative in a first position to depressurize the fluid line.

8. The vehicle brake system of claim 1, wherein the electronic trailer brake control system includes a piloted valve operative to connect the brake demand input port to the source of pressurized hydraulic fluid when activated, actuation of the piloted valve being controlled by the control valve.

9. The vehicle brake system of claim 8, wherein the control valve has an inlet fluidly connected with the source of pressurized hydraulic fluid and a fluid outlet, the control valve being movable between an inoperative position in which the inlet and outlet are disconnected so that fluid is unable to flow from the inlet through the outlet and at least one operative position in which the inlet and outlet are fluidly connected and fluid is able to flow from the inlet through the outlet, the outlet being fluidly connected with a control port of the piloted valve.

10. The vehicle brake system of claim 8, wherein a pressure discharge valve is connected in a fluid line between the control valve and the piloted valve, the discharge valve operative in a first position to depressurize the fluid line.

11. The vehicle brake system of claim 1, wherein the electronic trailer brake control system is configured to supply fluid to the brake demand input port at a pressure below a maximum pressure of the at least one service brake circuit.

12. The vehicle brake system of claim 11, further comprising a pressure-limiting valve in a fluid line between the source of pressurized hydraulic fluid and the control valve to limit the fluid pressure level through the control valve.

13. The vehicle brake system of claim 1, further comprising a pressure sensor for monitoring a pressure of the fluid output from the trailer brake demand output port, the electronic control system being configured to control operation of the electronic trailer brake control system in dependence on an output from the pressure sensor to maintain the pressure of the hydraulic fluid supplied to the brake demand input port at a predetermined level.

14. The vehicle brake system of claim 1, wherein the control valve is a proportional valve.

15. The vehicle brake system of claim 1, wherein the service brake system comprises a first service brake circuit and a second service brake circuit, each service brake circuit configured to forward fluid pressure indicative of a service brake demand of an operator, the trailer brake valve having a first service brake demand inlet port and a second service brake demand input port, a pressure output at the trailer brake demand output port being dependent on at least one inlet pressure selected from the group consisting of a pressure applied at the first service brake demand input port and a pressure applied at the second service brake demand input port, wherein one of the first and second service brake demand ports constitutes the brake demand input port and is operatively connected with its respective service brake circuit and an output from the electronic trailer brake control system through a shuttle valve.

16. The vehicle brake system of claim 1, wherein the service brake system comprises a first service brake circuit and a second service brake circuit, each service brake circuit configured to forward fluid pressure indicative of a service brake demand of an operator, the trailer brake valve having a first service brake demand inlet port and a second service brake demand input port, a pressure output at the trailer brake demand output port being dependent on at least one inlet pressure selected from the group consisting of a pressure applied at the first service brake demand input port and a pressure applied at the second service brake demand input port, wherein one of the first and second service brake circuits is connected with one of the first and second service demand input ports, the other of the first and second brake demand input ports being connected with an output from the electronic trailer brake control system.

17. The vehicle brake system of claim 1, wherein the control valve of the electronic trailer brake control system is connected with the source of pressurized hydraulic fluid through the trailer brake valve.

18. The vehicle brake system of claim 17, wherein the trailer brake valve has a fluid supply input port fluidly connected with the source of pressurized hydraulic fluid, the trailer brake valve having a fluid supply output port operatively connected with the fluid supply input port, the electronic trailer brake control system valve being fluidly connected with said fluid supply output port by a control system supply line.

19. An agricultural vehicle comprising the vehicle brake system of claim 1.

\* \* \* \* \*